Figure 1:
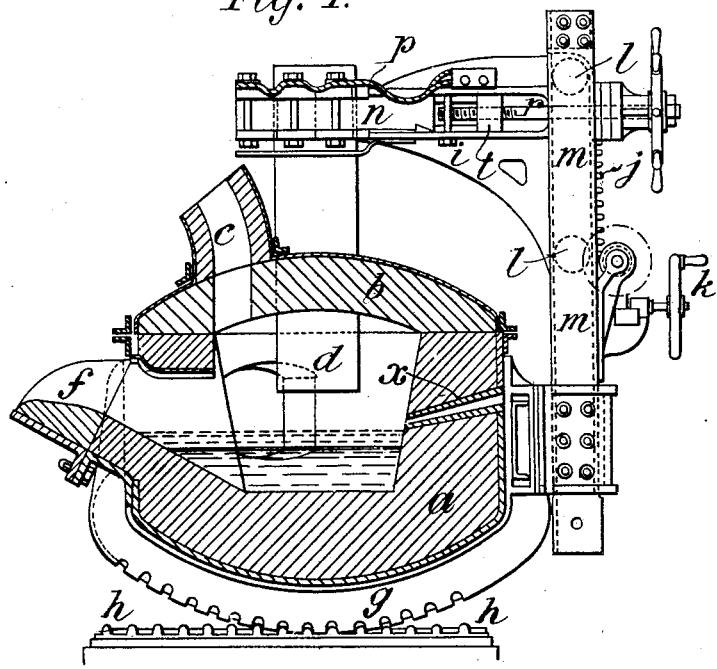

No. 707,776. Patented Aug. 26, 1902.
P. L. T. HÉROULT.
OSCILLATING ELECTRIC FURNACE.
(Application filed Aug. 21, 1901.)

(No Model.) 3 Sheets—Sheet 1.

WITNESSES:
Fred White
René Bruine

INVENTOR:
Paul Louis Toussaint Héroult,
By his Attorneys

No. 707,776. Patented Aug. 26, 1902.
P. L. T. HÉROULT.
OSCILLATING ELECTRIC FURNACE.
(Application filed Aug. 21, 1901.)

(No Model.) 3 Sheets—Sheet 2.

WITNESSES: INVENTOR:
Fred White Paul Louis Toussaint Héroult,
René Bruine By his Attorneys No. 707,776. Patented Aug. 26, 1902.
P. L. T. HÉROULT.
OSCILLATING ELECTRIC FURNACE.
(Application filed Aug. 21, 1901.)

(No Model.) 3 Sheets—Sheet 3.

UNITED STATES PATENT OFFICE.

PAUL LOUIS TOUSSAINT HÉROULT, OF LA PRAZ, FRANCE, ASSIGNOR TO SOCIÉTÉ ELECTRO METALLURGIQUE FRANCAISE, OF FROGES, ISÈRE, FRANCE.

OSCILLATING ELECTRIC FURNACE.

SPECIFICATION forming part of Letters Patent No. 707,776, dated August 26, 1902.

Application filed August 21, 1901. Serial No. 72,752. (No model.)

*To all whom it may concern:*

Be it known that I, PAUL LOUIS TOUSSAINT HÉROULT, a citizen of the Republic of France, residing in La Praz, Savoie, France, have invented a new and useful Oscillatory Electric Furnace, of which the following is a specification.

This invention relates to an electric furnace that is capable of being oscillated or tipped over for discharging its contents and which allows all the operations that are performed by means of the ordinary electric furnace to be carried on, with the advantage that it can be used for other operations, such as the manufacture of steel.

The arrangement of the furnace is such that its contents can, if desired, be only partially discharged, so as to leave a certain portion in the same for starting a further operation with certainty and rapidity. Also for certain purposes only a fraction of the contents of the furnace can be run off practically without interrupting the operation, which in being continued may result in a product different from the portion previously run off, so that, for example, several qualities of steel can be manufactured from a single charge of the furnace.

If the furnace be provided with suitably-arranged twyers, steel can be treated according to the Bessemer process by tilting the furnace backward, so that the metal covers the twyers, and then admitting the blast. In this case pig metal can be treated which need not contain either phosphorus or silicon, because in this case the necessary heat is not required to be furnished by the phosphorus or the silicon, being supplied by the electric energy either during the blast or during intervals when this is interrupted. For a furnace of the size shown with carbon electrodes thirty centimeters by thirty centimeters a current of about one hundred volts for the two arcs is employed, the strength varying from two thousand to five thousand amperes.

The tilting of the furnace can be effected by any suitable means, such as a hydraulic motor. The metal may be run from the furnace either into ingot-molds on truck or into casting-ladles.

A furnace constructed according to this invention is shown on the accompanying drawings.

Figure 2:
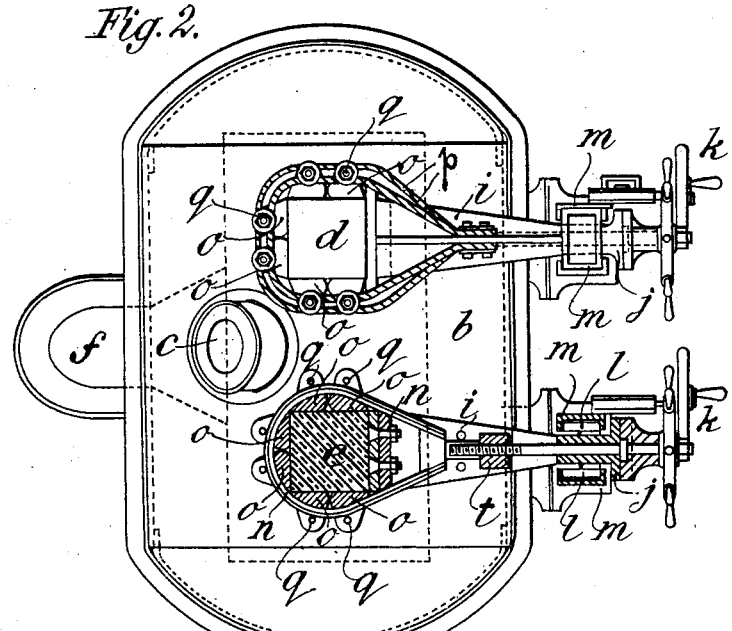
Figure 3:
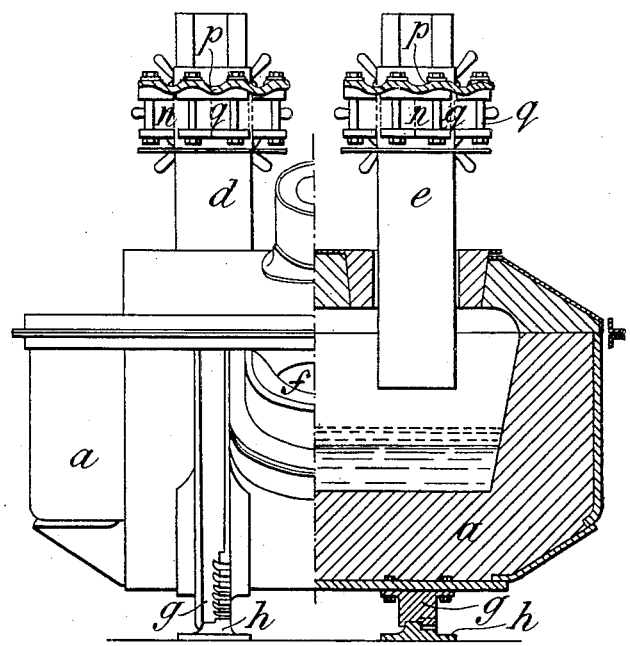
Figure 6:
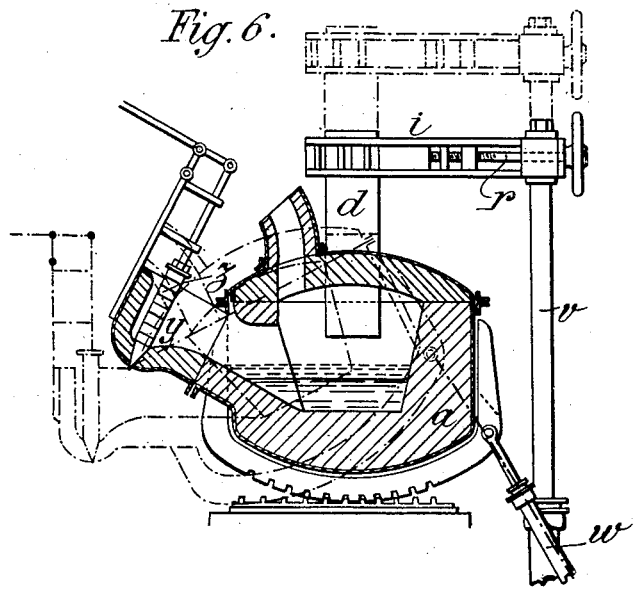
Figure 4:
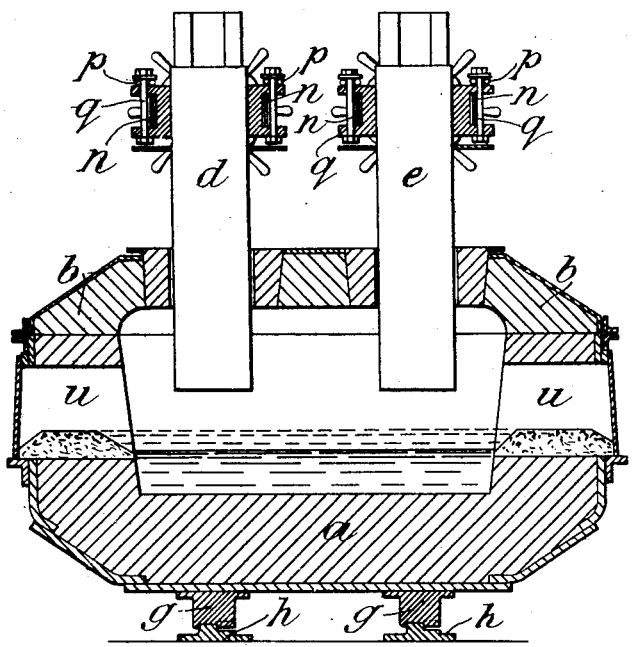
Figure 5:
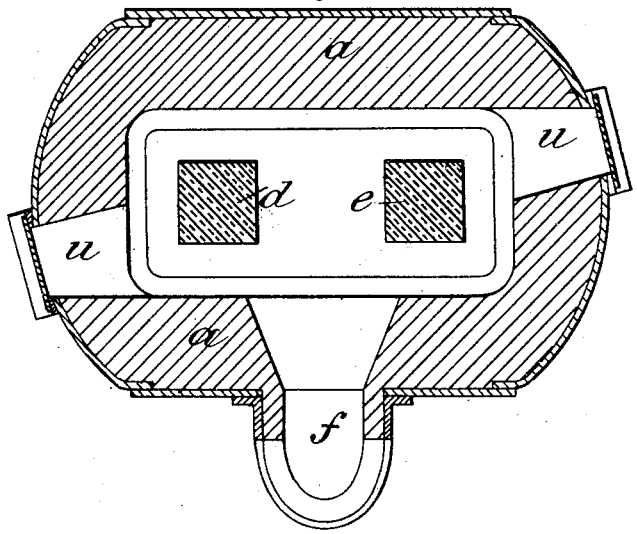

Figure 1 shows a longitudinal section; Fig. 2, a plan partly in section; and Fig. 3, a front view partly in section; Figs. 4 and 5 show, respectively, a longitudinal section and a sectional plan, showing the position of the working doors. Fig. 6 shows a somewhat different construction, to a smaller scale.

The furnace consists of a crucible $a$, closed by a cover $b$, which carries a small chimney $c$, and through which the two electrodes $d\ e$ pass. A spout $f$ is provided for running off the metal on tilting the furnace.

For effecting the tilting, the bottom of the furnace is arched and carries two arched rails $g$, having on one side a flange like a railway-wheel and formed with cogs on the other side, which engage with corresponding cogs formed on straight rails $h$, fixed on the floor. A flat portion of the rails $g$ rests upon the flat portion of the rails $h$ at the side of the cogs, which only serve for guiding. Each electrode is carried by an arm $i$, projecting from a sliding upright $j$, which can be raised or lowered by means of a rack and toothed gearing worked by a worm and hand-wheel $k$, the upright $j$ being guided by rollers $l$ in a standard $m$, which is of a trough-shaped section. These standards are fixed to the back of the furnace-casing, as shown, with the interposition of insulating material. Each carbon electrode is surrounded by a collar or loop $n$ of sheet metal, copper wedges $o$ being inserted between the two, which wedges serve to convey the electric current to the electrode, conducting-cables $p$ serving to supply the current to the wedges, to which they are secured by bolts $q$. A screw-spindle $r$, turned by a hand-wheel, enables the collar $n$ to be tightened up or loosened, the spindle bearing against the electrode by means of the plate $s$ of the arm $i$ and screwing through a nut $t$, fixed to the two ends of the collar $n$. Two doors $u$, arranged in diagonal positions at each narrow end of the furnace, serve for charging the materials, as also for repairs and for clearing the furnace-bed and the electrodes from adhering material.

In the construction shown at Fig. 6 the carbon electrodes are carried by the arm $i$, fixed to the upper end of a plunger $v$ of a hydraulic cylinder, whereby the electrodes can be more readily raised up entirely out of the furnace. Another hydraulic cylinder $w$, the plunger of which is attached to the rail $g$, serves to tilt the furnace over when required, as indicated by the dotted lines at Fig. 6.

When the furnace is to be used for bessemerizing, a wind-chest is provided at the back of the furnace, as shown at Fig 1, from which twyers $x$ pass through the furnace-wall in such a position as to open above the metal-bath for ordinary working, but which are submerged in the bath when the furnace is tilted backward, so that on then sending a blast through them the required bessemerizing is carried out. The tubes $x$ may be connected by any suitable means—such, for example, as flexible tubes—to the source of air.

If the spout of the furnace be formed as a ladle at its end, as shown at $y$, Fig. 6, and provided with a discharge-hole and plug $z$, the furnace may be used directly for casting purposes on being tilted forward, and as the metal is in this case drawn from the bottom of the bath it will be very free from impurities.

Any suitable materials may be employed in the construction of the furnace. For example, the electrodes should be of carbon of the highest possible conductivity, and the arch, base, and walls may be of magnesia, dolomite, silica, minerals of chromium, bauxite, or the like.

Having thus described the nature of this invention and the best means I know of carrying the same into practical effect, I claim—

1. In an oscillatory electric furnace, the combination of an electrode, a support, a collar or loop surrounding said electrode and holding it on said support, copper wedges pressed against said electrode by said collar, and a connection between said wedges and the electric circuit.

2. The combination with an oscillatory electric furnace, of an electrode movable relatively thereto and oscillating therewith, hydraulic means for oscillating said furnace and electrode, and hydraulic means for moving said electrode relatively to said furnace.

3. The combination with an electric furnace carrying arched cogged rails on its bottom, of similarly-cogged rails engaging said arched rails and supporting said furnace and upon which said furnace may be oscillated or tipped, an electrode movable relatively to said furnace and oscillating therewith, hydraulic means for oscillating said furnace and electrode, and hydraulic means for moving said electrode relatively to said furnace.

In witness whereof I have hereunto signed my name in the presence of two subscribing witnesses.

PAUL LOUIS TOUSSAINT HÉROULT.

Witnesses:
SONNERY, LOUIS XAVIER,
MAURICE VICTOR EMMANUEL SONNERY.